United States Patent [19]
Davis

[11] 3,731,860  
[45] May 8, 1973

[54] CAMPER-BUMPER COMPARTMENT AND STEP

[76] Inventor: Arlyn W. Davis, Rt. No. 2, P.O. Box 228, Sheridan, Oreg.

[22] Filed: Dec. 31, 1970

[21] Appl. No.: 103,030

[52] U.S. Cl. .......................... 224/42.06, 224/42.03 A
[51] Int. Cl. .................................................. B60r 9/06
[58] Field of Search .................... 224/42.06, 42.03 A, 224/42.04, 42.05, 42.07, 42.41, 42.23; 293/69 R, 73; 296/37 R, 37.2, 30 R

[56] References Cited

UNITED STATES PATENTS

| | | | |
|---|---|---|---|
| 3,471,070 | 10/1969 | Olson | 224/42.04 |
| 1,729,663 | 10/1929 | Martin | 296/30 |
| 3,398,846 | 8/1968 | Ragan | 224/42.23 X |
| 3,606,385 | 9/1971 | Johannes | 224/42.04 X |

*Primary Examiner*—Gerald M. Forlenza  
*Assistant Examiner*—Lawrence J. Oresky  
*Attorney*—James D. Givnan

[57] ABSTRACT

A spare tire mount for a vehicle having a chassis including a pair of longitudinal frame members of channel section. The tire mount is of box-like formation incorporated in the vehicle structure in a manner which adds to the utility of the vehicle, protects the same from damage liable to be sustained by accidental collision with a following vehicle, and which provides means for carrying extra tires, tools, baggage and the like, which are also protected by the box-like structure.

1 Claim, 3 Drawing Figures

PATENTED MAY 8 1973 3,731,860

ARLYN W. DAVIS
INVENTOR.

BY James D. Girnard
ATT'Y

CAMPER-BUMPER COMPARTMENT AND STEP

This invention relates to a tire mount as above described whose objects are:

To provide a box-like unitary structure welded or bolted to, and depending from, the rearward end of a vehicle chassis and extending rearwardly therefrom a sufficient distance to provide a bumper structure including a trailer hitch component intermediate the ends of the bumper and a closure for the rearward end of the box-like structure.

To provide a spare tire mount capable of supporting a spare tire firmly against rattling and displacement, yet which will render the spare tire accessible for easy removal.

The foregoing and other objects and advantages which will become subsequently apparent reside in the details of construction and operation as more fully hereinafter described and claimed, reference being had to the accompanying drawing forming a part hereof and in which:

Figure 2:
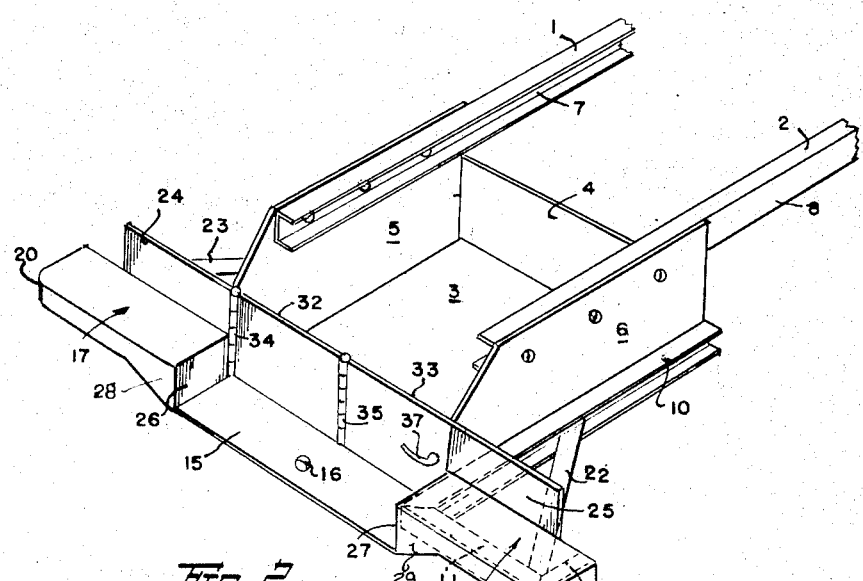
FIG. 2 is a perspective view of FIG. 1 with the spare tire and wheel removed.

With continuing reference to the drawing wherein like reference numerals designate like parts, numerals 1 and 2 indicate the rear end portion of a vehicle chassis having parallel frame members of channel section as best shown in FIG. 2.

The tire mount proper comprises a box-like structure consisting of a bottom wall 3, a front wall 4, and parallel side walls 5 and 6 welded or otherwise secured to the outside of the webs 7 and 8 of the channel frame members 1 and 2.

Similar channel sections 9 and 10 are secured to the bottom outside marginal portions of the side walls 5 and 6, and extend laterally as at 11 and 12 (FIGS. 1 and 2) then forwardly as at 13 and 14. A rearward extension 15 of the bottom wall 3 provides a step-plate having a central opening 16 therethrough to accommodate a ball member or similar coupling component of a trailer hitch, not shown. The lateral and forwardly extending channel members 11-12 and 13-14 are reinforced by top cover plates 17-18, and vertical wrap-around cover strips 19-20, and by diagonal trusses 22-23 welded at their rearward end to the lateral extensions 11-12 and at their forward end to the channel members 9 and 10 intermediate the ends thereof. Still further reinforcement is provided by wall members 24-25 welded to the rear edges of the cover plates 17-18.

The inner end portion of each top cover plate 17-18 extends downwardly as at 26-27 and is welded across its bottom edge to the end of the step plate 15. Further reinforcement is provided by welding the gusset-like inner end portions 28-29 of the vertical wrap around cover strips 19-20 to the rearward vertical edges of the downwardly extending portions 26-27 of the cover plates 17-18.

Figure 1:
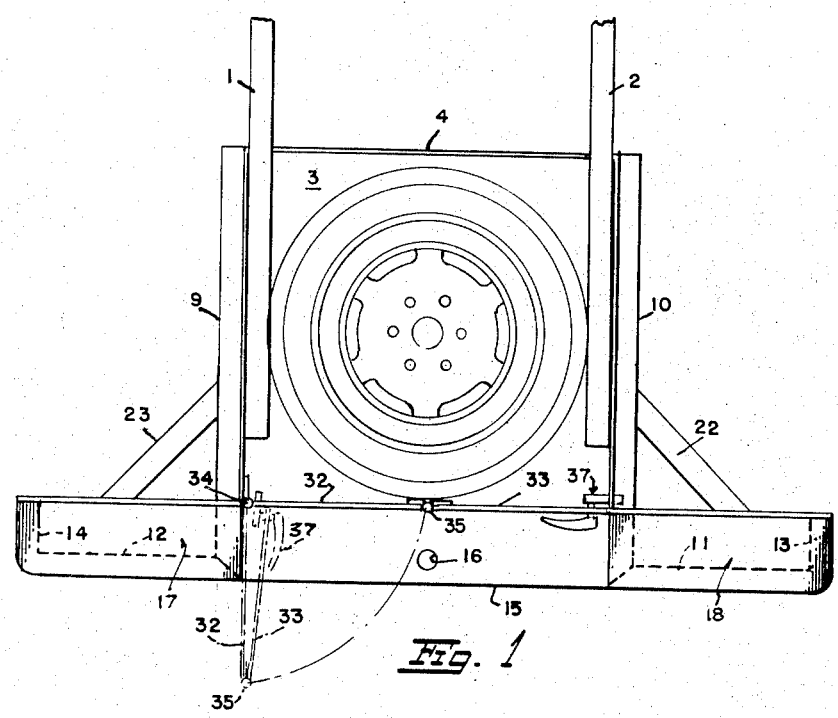
FIG. 1 is a top plan view of a spare tire mount made in accordance with my invention.

As shown in FIGS. 1 and 2, a rear wall for the box-like structure is made of two parts 32-33 with the end of the one part 32 hingedly attached as at 34 to the rear end of the side wall 5 and to the inner end of plate 24. The opposite end of part 32 is hingedly attached as at 35 to the inner end of part 33 whose opposite end is provided with a latch 37 selectively engageable with a vertical slot (not shown) near the rearward edge of the side wall 6. From the foregoing, and with particular reference to FIG. 1, it will be apparent that after releasing the latch 37, both door parts can be swung to the broken line position of collapse about the center hinge 35 as it swings along the broken line arcuate path as the part 32 swings about hinge 34.

Figure 3:
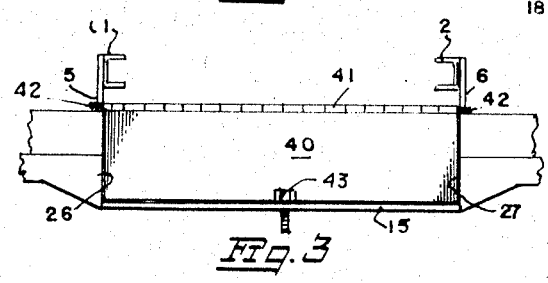
FIG. 3 is a rear elevational view of FIG. 2 showing a modified form of closure for the tire mount structure.

In the modification shown in FIG. 3, a unitary door 40 is hingedly suspended as at 41 from a rod 42 secured at both its ends to the rear edges of the side walls 5 and 6. A bolt 43 dropped through an aperture (not shown) in the step plate can be used as a detent to keep the door closed.

What I claim is:

1. A spare tire mount for a vehicle having a chassis including a pair of spaced apart longitudinal frame members of channel section,
   a box-like structure comprising a bottom wall, side walls, and a front end wall,
   all of said walls permanently secured to each other,
   means securing said side walls to said chassis frame members,
   said bottom wall extending rearwardly from said side walls,
   a pair of channel sections secured to said side walls along the bottom edges thereof and coextensive in length with said bottom wall,
   said last mentioned channel sections extending laterally from said box-like structure and bent forwardly at their outer ends,
   truss members interconnecting said channel frame sections and said laterally extending portions thereof,
   said box-like structure, including a normally coplanar two-piece rear wall,
   one of said rear wall pieces hingedly attached along its outer edge to the rearward edge of one of said side walls,
   the other piece of said two-piece rear wall having a latch member attached thereto and selectively engageable with the other of said side walls for maintaining said rear wall closed, and
   means hingedly interconnecting the inner adjacent edges of both of said rear wall pieces.

* * * * *